US009518733B1

(12) United States Patent
Dhyllon

(10) Patent No.: US 9,518,733 B1
(45) Date of Patent: Dec. 13, 2016

(54) FURNACE APPARATUS

(71) Applicant: Amen Dhyllon, Wynnewood, PA (US)

(72) Inventor: Amen Dhyllon, Wynnewood, PA (US)

( * ) Notice: Subject to any disclaimer, the term of this patent is extended or adjusted under 35 U.S.C. 154(b) by 52 days.

(21) Appl. No.: 15/052,227

(22) Filed: Feb. 24, 2016

(51) Int. Cl.
*F23G 5/00* (2006.01)
*F23G 5/44* (2006.01)
*F23G 5/32* (2006.01)

(52) U.S. Cl.
CPC ............... *F23G 5/442* (2013.01); *F23G 5/32* (2013.01)

(58) Field of Classification Search
CPC ............... C10J 2300/1238; C10J 2300/0946; C10J 3/723; C10J 3/00; C10J 2300/0956; C10J 3/02; C10J 3/46; C10J 2300/0909; C10J 2300/1606; C10J 2300/165; C10J 2300/1671; C10J 3/18; C10J 3/20; C10J 3/32; C10J 2300/0976; C10J 3/42; C10J 2300/092; C10J 2300/1853; F23G 5/442; F23G 5/444; F23G 5/446; F23C 99/01; F23C 2900/99005; F02M 27/045; C02F 1/48; F27B 17/00
See application file for complete search history.

*Primary Examiner* — Jason Lau
(74) *Attorney, Agent, or Firm* — Joseph Terzo, Esq.; IP Global Patents

(57) ABSTRACT

A furnace apparatus to incinerate solid waste comprises a chamber, a solid waste feed inlet, air inlet pipes, and air outlet pipes. The chamber includes an upper pyrolysis section and a lower combustion section, and the solid waste feed inlet is positioned at an upper portion of the chamber to feed solid waste to the lower combustion section. The air inlet pipes receive air for combustion of the solid waste within the lower combustion section. The air outlet pipes exhaust combusted air from the lower combustion section, where multiple magnets are operably attached on the air inlet pipes and the air outlet pipes. The paramagnetic oxygen present in the received air is concentrated via the magnets, and the concentrated oxygen is introduced into a plasma generated within the combustion section to accelerate the combustion process, and to oxidize toxic matter present in the solid waste.

10 Claims, 8 Drawing Sheets

FURNACE APPARATUS

BACKGROUND

Solid waste disposal has been a major issue in many countries, especially in the USA where there is a need for elimination of landfill problems for garbage disposal. Traditionally, in the past, most of the solid waste was burned and was disposed off under the soil. But eventually, climatic changes like rainfall and change in the level of water table discouraged this practice in the long run. So there was a need for a more compact and strategic method to dispose solid waste. Therefore incinerators were invented which specialized in the burning and disposal of solid waste in disposable form according to safety and pollution standards around the world.

Incineration process is striking substitute for dumping for the disposal of garbage, and is performed throughout the world and results in a substantial reduction in the volume of solid waste and the retrieval of energy, for example, as electricity or steam. One of the important disadvantages to the incineration process is that numerous stable and toxic compounds, comprising polychlorinated dibenzodioxins or "dioxins" and polychlorinated bidenzofurans, are formed and are present in parts-per-million (ppm) concentrations both in the fly-ash formed through combustion and in emissions within the stack. Further, conventional incineration requires a secondary chamber, and therefore this increases the size of the machine and reduces the efficiency of the machine. Incineration also requires a source of energy to attain the temperature so its energy consuming.

Millions of tons of garbage is incinerated in big cities, and for every million tons of waste incinerated, a significant amount of fly-ash is produced, and the fly-ash thus produced is precipitated electrostatically and dumped in landfills. The rest of the fly-ash is emitted from the incinerator stack along with the gaseous by-products, such as water vapor, carbon dioxide, air and other organic compounds. The gaseous stack emissions deploy dioxins to the atmosphere and landfill disposal of fly-ash deploys dioxins into the earth, from where the dioxins into leak into water channels beneath the soil. The main threat of dioxins to humans is cancer, but dioxins create a much larger impact on the environment and are considered objectionable.

Therefore, there exists a need for a self-sustainable furnace apparatus to decrease the dioxin content in incineration systems, and simultaneously solve landfill issues by reducing the volume of garbage in a very short amount of time depending upon the moisture content.

SUMMARY OF THE INVENTION

The furnace apparatus disclosed herein is configured to incinerate solid waste, and comprises a chamber of generally square cross section, a solid waste feed inlet, multiple air inlet pipes, and multiple air outlet pipes. The chamber comprises an upper pyrolysis section and a lower combustion section, and the solid waste feed inlet is positioned at an upper portion of the chamber configured to feed solid waste to the lower combustion section. The air inlet pipes are fixedly connected to a lower portion of the chamber to receive air for combustion of the solid waste within the lower combustion section. The air outlet pipes are fixedly connected to the lower portion of the chamber and opposingly positioned to the air inlet pipes to exhaust combusted air from the lower combustion section, where multiple magnets are operably attached on the air inlet pipes and the air outlet pipes. The paramagnetic oxygen present in the received air is concentrated via the magnets, and the concentrated oxygen is introduced into a plasma generated within the combustion section to accelerate the combustion process, and to oxidize toxic matter present in the solid waste.

In an embodiment, the solid waste feed inlet is defined as a feed chute of as generally cuboidal shape comprising a top covering plate configured to open the feed chute to receive the solid waste, and a toggle clamp to close and rigidly shut the top covering plate in a closed position during the combustion process inside the lower combustion section. In an embodiment, the furnace apparatus further comprises an upper airlock positioned below the solid waste feed inlet, where the upper airlock is configured to prevent the flow of exhaust air from within the lower combustion section into the solid waste feed inlet. In an embodiment, the furnace apparatus further comprises an ignition chamber positioned adjacent to the lower combustion section, where an ignition starter material is loaded into the ignition chamber, and ignited to be introduced into the lower combustion section for the combustion of the solid waste. In an embodiment, the furnace apparatus further comprises a drip pan chamber positioned below the lower combustion section, where the drip pan chamber is configured to collect the combustion waste which drips out of the lower combustion section.

In an embodiment, the furnace apparatus further comprises a bottom stirrer positioned at a lower section of the lower combustion section, where the bottom stirrer is configured to stir the solid waste during the combustion process. In an embodiment, the furnace apparatus further comprises a bottom airlock positioned below the lower combustion section, where the bottom airlock is configured to prevent expulsion of combusted air through a lower section of the lower combustion section. In an embodiment, the furnace apparatus further comprises coil sections positioned within the upper pyrolysis section and the lower combustion section, where the coil sections are configured to transfer the heat via conduction to assist in the combustion of the solid waste and to prevent the overheating of the walls of the chamber. In an embodiment, the furnace apparatus further comprises a walk way positioned adjacent to the chamber configured to allow a user to climb above the chamber and open the top covering plate of the solid waste feed inlet to feed in the solid waste.

In an embodiment, the furnace apparatus further comprises a combusted air exhaust assembly which comprises a chimney, a blower fan, and a scrubber. The chimney is upwardly extending from the air outlet pipes and in fluid communication with the lower combustion section. The blower fan is positioned within the chimney at a predefined position, where the blower fan is configured to provide an induced draft to suction and exhaust the combusted gases from the lower combustion section, and the scrubber is positioned at a predefined distance above the blower fan, where the scrubber is configured to separate particulate matter from the exhausted combusted air.

DETAILED DESCRIPTION OF THE INVENTION

Figure 1A:
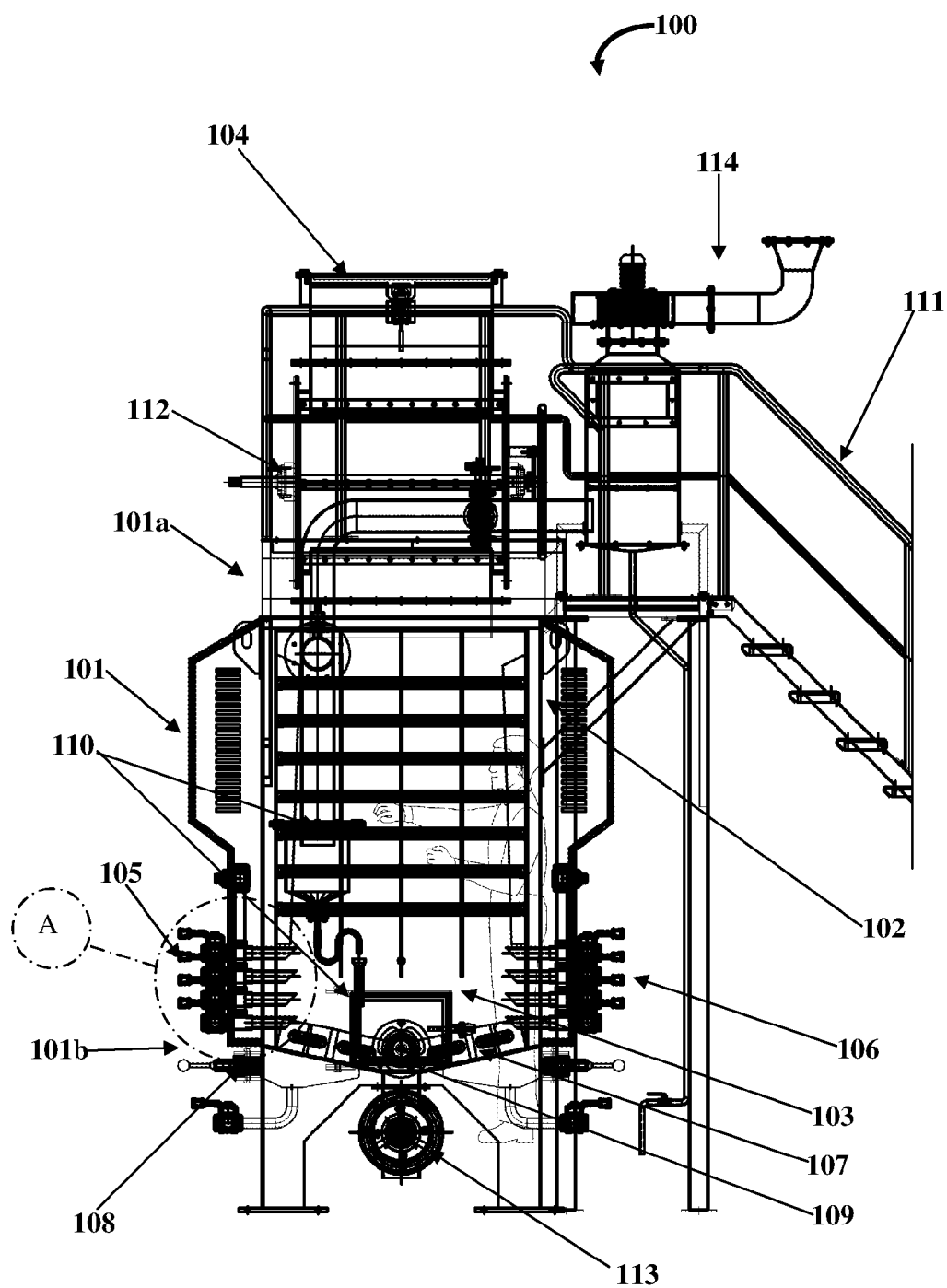
FIG. 1A exemplarily illustrates is a front perspective of the furnace apparatus.
Figure 1B:
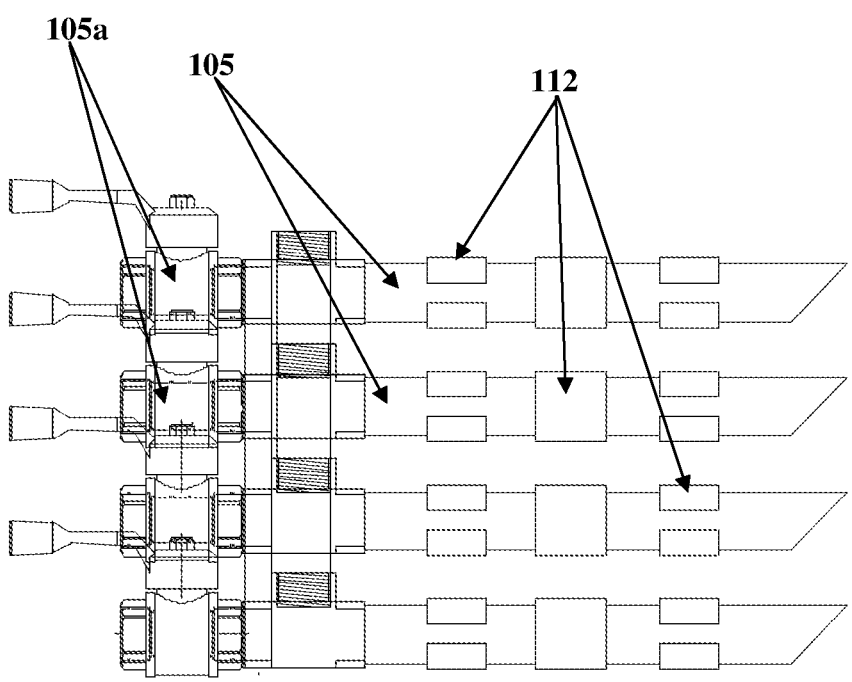
FIG. 1B exemplarily illustrates is an enlarged view of the portion marked A in FIG. 1A which shows a perspective view of the air inlet pipe with magnets positioned on the surface.
Figure 1C:
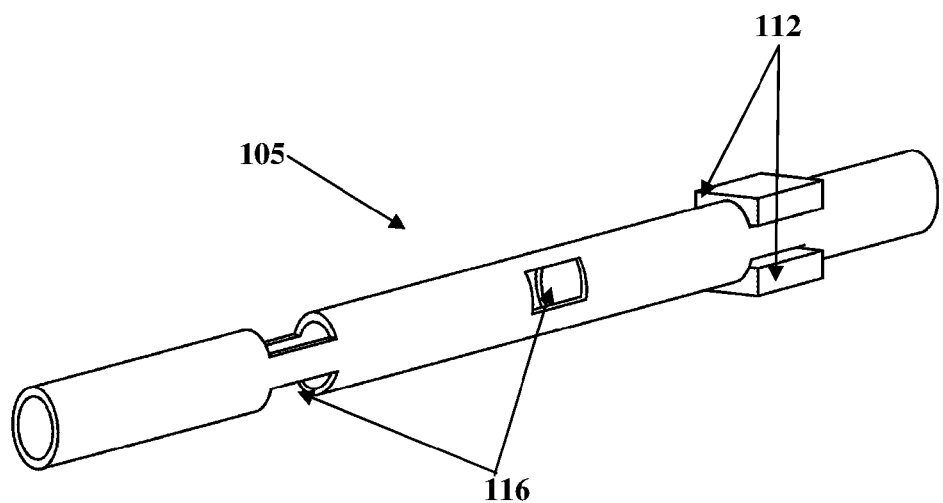
FIG. 1C exemplarily illustrates is an enlarged view of the portion marked A in FIG. 1A which shows a perspective view of one of the air outlet pipe and the air inlet pipe with magnets positioned on the surface.
Figure 1D:
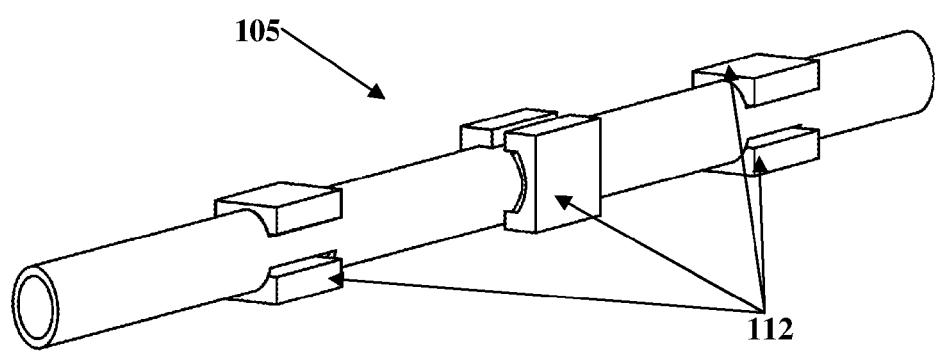
FIG. 1D exemplarily illustrates is an enlarged view of the portion marked A in FIG. 1A which shows a perspective view of an embodiment of one of the air outlet pipe and the air inlet pipe with six magnets positioned on the surface.

FIG. 1A exemplarily illustrates is a front perspective of the furnace apparatus 100, FIG. 1B exemplarily illustrates is an enlarged view of the portion marked A in FIG. 1A which shows a perspective view of the air inlet pipe 105 with magnets 112 positioned on the surface, FIG. 1C exemplarily illustrates is an enlarged view of the portion marked A in FIG. 1A which shows a perspective view of one of the air outlet pipe 106 and the air inlet pipe 105 with magnets 112 positioned on the surface, and FIG. 1D exemplarily illustrates is an enlarged view of the portion marked A in FIG. 1A which shows a perspective view of an embodiment of one of the air outlet pipe 106 and the air inlet pipe 105 with six magnets 112 positioned on the surface. The term "magnets" will be, herein after referred to as "Neodymium iron boron blocks". The furnace apparatus 100 disclosed herein is configured to incinerate solid waste, and comprises a generally chamber 101, a solid waste feed inlet 104, multiple air inlet pipes 105, and multiple air outlet pipes 106.

The chamber 101 is generally of a square cross section, and comprises an upper pyrolysis section 102 and a lower combustion section 103, and the solid waste feed inlet 104 is positioned at an upper portion 101a of the chamber 101 configured to feed solid waste to the lower combustion section 103. The air inlet pipes 105 are fixedly connected to a lower portion 101b of the chamber 101 to receive air for combustion of the solid waste within the lower combustion section 103. As shown in FIG. 1B, the air is received in a controlled manner via air inlet valves 105a positioned distally to the air inlet pipes 105. The air outlet pipes 106 are fixedly connected to the lower portion 101b of the chamber 101 and opposingly positioned to the air inlet pipes 105 to exhaust combusted air from the lower combustion section 103, where multiple Neodymium Iron Boron blocks 112 are operably attached on the air inlet pipes 105 and the air outlet pipes 106. In an embodiment, the air outlet pipe 106 and the air inlet pipe 105 are configured to be attached with at least pair of Neodymium iron boron blocks 112 on opposing sides, as shown in FIG. 1C, and six Neodymium iron boron blocks 112 on opposing sides alternatively, as shown in FIG. 1D. The paramagnetic oxygen present in the received air is concentrated via the Neodymium Iron Boron blocks 112, and the concentrated oxygen is introduced into a plasma generated within the lower combustion section 103 to accelerate the combustion process, and to oxidize toxic matter present in the solid waste.

In an embodiment, the furnace apparatus 100 further comprises an ignition chamber 107 positioned adjacent to the lower combustion chamber 103, where an ignition starter material is loaded into the ignition chamber 107, and ignited to be introduced into the lower combustion chamber 103 for the combustion of the solid waste. The ignition starter material is, for example, camphor and dry wood. In an embodiment, the furnace apparatus 100 further comprises a drip pan chamber 108 positioned below the lower combustion chamber 103, where the drip pan chamber 108 is configured to collect the combustion waste which drips out of the lower combustion chamber 103.

Figure 2:
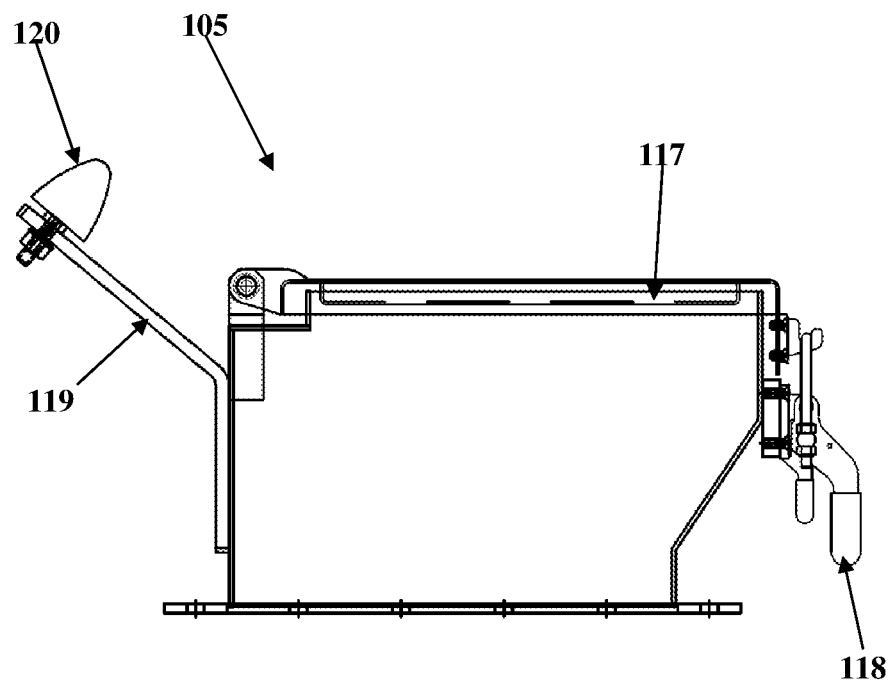
FIG. 2 exemplarily illustrates a side perspective of a solid waste feed inlet of the furnace apparatus.

In an embodiment, the furnace apparatus 100 further comprises a bottom stirrer 109 positioned at a lower section 101b of the lower combustion chamber 103, where the bottom stirrer 109 is configured to stir the solid waste during the combustion process. In an embodiment, the furnace apparatus 100 further comprises coil sections 110 positioned within the upper pyrolysis section 102 and the lower combustion section 103, where the coil sections 110 are configured to transfer the heat via conduction to assist in the combustion of the solid waste and to prevent the overheating of the walls of the chamber 101. In an embodiment, the furnace apparatus 101 further comprises a walk way 111 positioned adjacent to the chamber 101 configured to allow a user to climb above the chamber 101 and open the top covering plate 117 as shown in FIG. 2, of the solid waste feed inlet 104 to feed in the solid waste. The other components of the furnace apparatus 100 comprising the upper airlock 112, the bottom air lock 113, and the combusted air exhaust assembly 114, are disclosed in the FIGS. 2-8.

As used herein, the term "plasma" refers to an ionized gas, in which some electrons are removed from atoms and molecules and are free to move, which is created by permanent Neodymium Iron Boron blocks 115 at high temperatures, of about 300-400° C. (degree celsius). When a small amount of oxygen is absorbed into the plasma, highly reactive, negatively charged oxygen ions, that is, the atoms and molecules that have lost electrons are positive ions which are positively charged; and electrons that have been removed are negative ions which are negatively charged are formed. This oxygen with negative ions is highly oxidative, thus decomposing dioxins and other harmful compounds by oxidation.

Further, as shown in FIG. 1C which illustrates is an enlarged view of the portion marked A in FIG. 1A which shows a perspective view of the air outlet pipe 106 and the air inlet pipe 105 with Neodymium Iron Boron blocks 115 positioned on the surface. The air outlet pipe 106 or the air inlet pipe 105 is bored open on predefined sections as shown in FIG. 1C, and then Neodymium Iron Boron blocks 115 are positioned over the open portions 116 and connected to the lower section 101b of the chamber 101 to be in communication with the lower combustion chamber 103. The Neodymium Iron Boron blocks 115 are used because of the paramagnetic and diamagnetic nature of the gases present in the air being received inside the lower combustion chamber 103 via the air inlet pipe 105, therefore oxygen being paramagnetic in nature is attracted and gets concentrated in the received air for combustion therefore increasing the rate of combustion, while the diamagnetic nitrogen gas is repelled due to magnetic act FIG. 2 exemplarily illustrates a side perspective of a solid waste feed inlet 104 of the furnace apparatus 100. In an embodiment, the solid waste feed inlet 104 is defined as a feed chute of as generally cuboidal shape comprising a top covering plate 117 configured to open the feed chute to receive the solid waste, and a toggle clamp 118 to close and rigidly shut the top covering plate 117 in a closed position during the combustion process inside the lower combustion chamber 103. Further, the furnace apparatus 100 comprises a stopper plate 119 with a rubber mounting 120 configured to rigidly adjust the top covering plate 117 in position.

Figure 3:
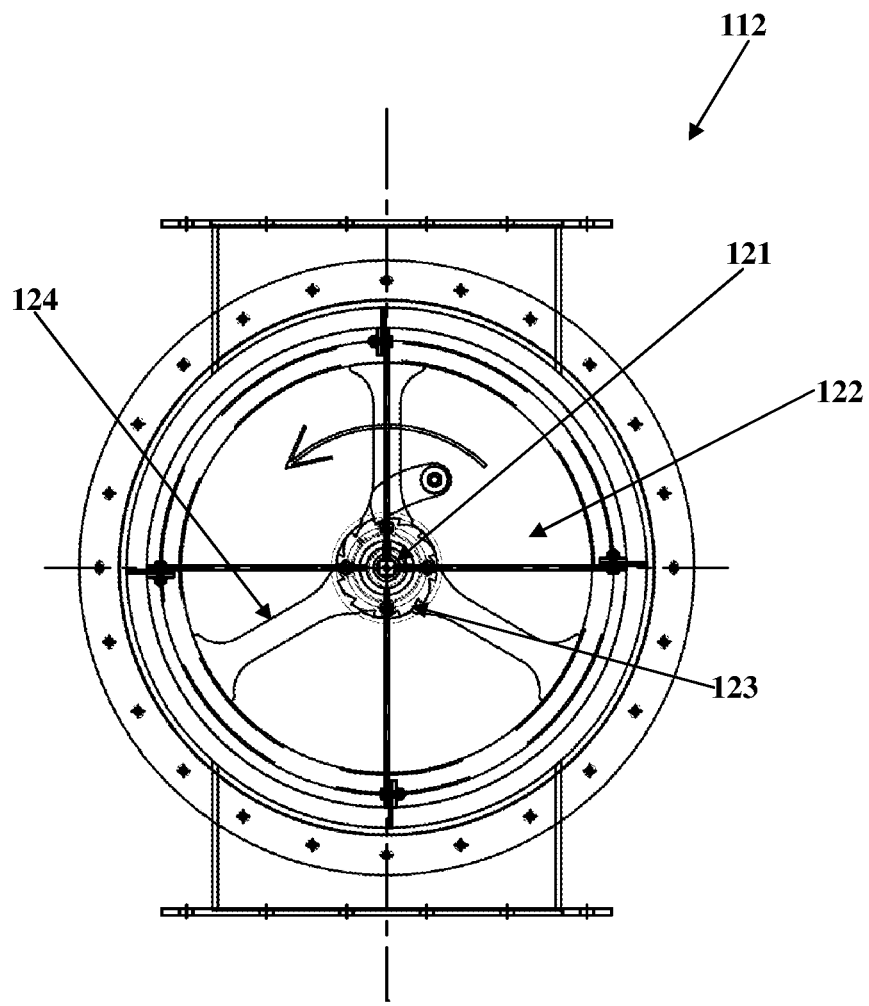
FIG. 3 exemplarily illustrates a side perspective of an upper airlock of the furnace apparatus.

FIG. 3 exemplarily illustrates a side perspective of an upper airlock 112 of the furnace apparatus 100. In an embodiment, the furnace apparatus 100 further comprises an upper airlock 112 positioned below the solid waste feed inlet 104, where the upper airlock 112 is configured to prevent the flow of exhaust air from within the lower combustion chamber 103 into the solid waste feed inlet 104. The upper airlock 112 comprises an airlock shaft 121 which receives the drive for the upper airlock 112, the covering plate 122 to cover the upper airlock 112 frontally, bearing member 123 to take the load of the airlock shaft 121, and the circular plate 124 to actuate the upper airlock 112 manually.

Figure 4:
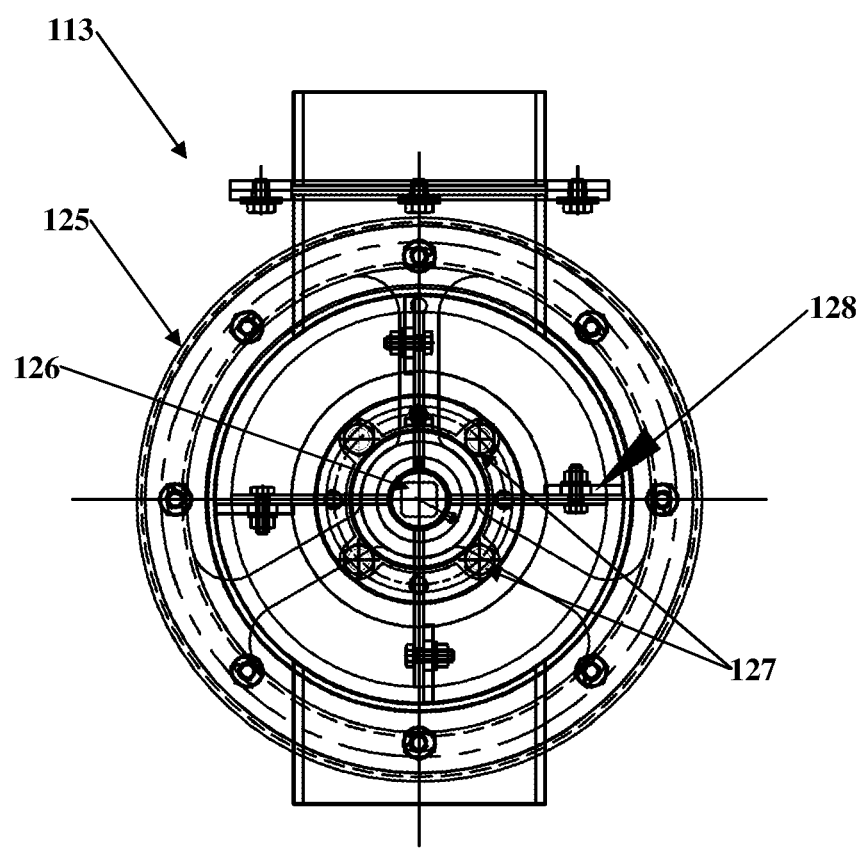
FIG. 4 exemplarily illustrates a side perspective of a bottom airlock of the furnace apparatus.

FIG. 4 exemplarily illustrates a side perspective of a bottom airlock 113 of the furnace apparatus 100. In an embodiment, the furnace apparatus 100 further comprises a bottom airlock 113 positioned below the lower combustion chamber 103, where the bottom airlock 113 is configured to prevent expulsion of combusted air through a lower section of the lower combustion chamber 103. The bottom airlock 113 also comprises a covering plate 125, a bottom airlock shaft 126, bearing members 127 to take the load of the bottom airlock shaft 126, and a stirrer strip 128.

Figure 5:
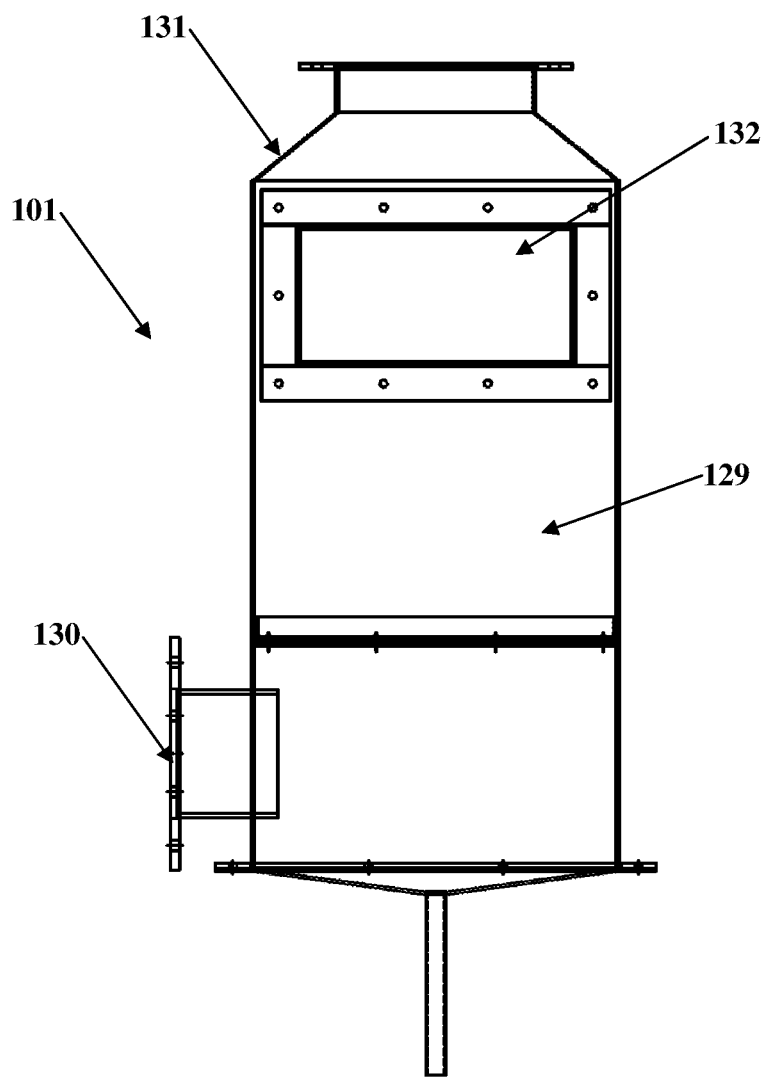
FIG. 5 exemplarily illustrates a side perspective of a chamber of the furnace apparatus.

FIG. 5 exemplarily illustrates a side perspective of a chamber 101 of the furnace apparatus 100. The chamber 101 is used to house the sub components of the furnace apparatus 100. The chamber 101 comprises a outer steel plate 129, an inlet section 130 for positioning air inlet pipes 105, a transition cone 131 positioned upwardly to the chamber 101 to exhaust the smoke, and a mouth plate 132 proximal to the pyrolysis section 102 of the chamber 101.

Figure 6:
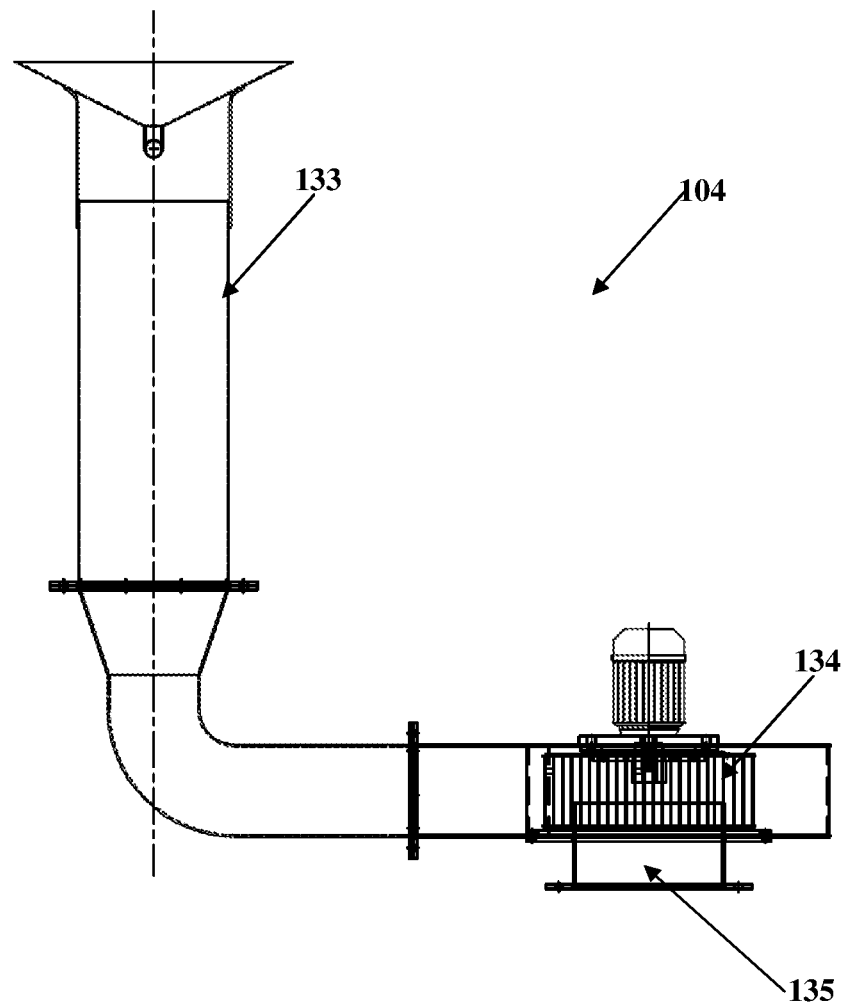
FIG. 6 exemplarily illustrates a side perspective of a combusted air exhaust assembly of the furnace apparatus.

FIG. 6 exemplarily illustrates a side perspective of a combusted air exhaust assembly 114 of the furnace apparatus 100. In an embodiment, the furnace apparatus 100 further comprises a combusted air exhaust assembly 114 which comprises a chimney 133, a blower fan 134, and a scrubber 135. The chimney 114 is upwardly extending from the air outlet pipes 106 and in fluid communication with the lower combustion chamber 103. The blower fan 134 is positioned within the chimney 133 at a predefined position, where the blower fan 134 is configured to provide an induced draft to suction and exhaust the combusted gases from the lower combustion chamber 103, and the scrubber 135 is positioned at a predefined distance above the blower fan, 134 where the scrubber 135 is configured to separate particulate matter from the exhausted combusted air. As the magnets 112 induce a controlled oxygen flow and destroys any dioxin formation, there is no harmful exhaust gases, but in additionally, the scrubber 135 enables to remove almost 100 percent of the harmful exhaust gases from the furnace apparatus 100.

In an example, the working principle of the furnace apparatus 100 depends on closed chamber destruction of waste with plasma and ionization techniques at "oxygen starved" condition. The decomposition temperature of the solid waste is around 350-450 Degree Celsius and depends on the solid waste input. The furnace apparatus 100 not require electric, other power or fuel for organic substances for decomposition. The Process Waste has to be feed into the lower combustion section 103 of furnace apparatus 100 on uniform intervals. At the initial stage requires start up fire by using camphor or dry wood afterwards destruction starts slowly by splitting the molecules into atoms. These atoms further ionized as electron, proton and neutron and this state is called as "plasma state" and separated electron change to "accelerated electron" with strong energy. On the other side a small amount of atmospheric air is allowed to pass through strong magnetic field via the magnetically defined air inlet pipes 105 into oxygen starved lower combustion section 103.

During this operation oxygen molecule split into elemental oxygen with negative charge. This atomic oxygen is to oxidize perfectly organic surface and change organic matter to separate organic oxide. Therefore reaction is induced by exothermic phenomenon, thermal condition around 200 degree Celsius is needed to accelerate reaction which can achieve by initial decomposition. From 200 degree Celsius, by initial firing, to a range of 350 to 650 degree Celsius in the furnace apparatus 100 by plasma, ionization and thermal Vibration will achieve. The decomposition of waste takes place on bed wise so that heat energy developed may not be continuous. At the bottom of the lower combustion section 103 or the destruction chamber a tubular type radiator which makes buried near the lower layer of deposited ash and ash will be separated. The waste heat is recovered through a tubular heat sink arranged near the upper layer of deposited ash of a hearth center section of said combustion chamber 101 and the hearth periphery and the entire structure will have good heat transfer potential. As compared to a conventional incinerator which requires a source of energy to attain the temperature, the furnace apparatus 100 disclosed here does not use any source of energy.

The waste heat is recovered back and supply to the wet waste where the moisture content is reducing phenomenally. The flue gas emission from the lower combustion section 103 is releasing with natural draft. The emission may contain some toxic components like Dioxin and Furan, Heavy metals, Nitrogen Oxides etc. The toxic components are destructed by using external Dry scrubber 135 and Moisture arrestor. The dry scrubber 135 which will be connected through Moisture arrestor where moisture content in the smoke condensed and remaining passes through 3 stage of filter called Pre-filter washable type mesh with activated carbon granules which observes odors and second stage with supported pleat media helps maintain a compact unitized structure under variable air velocities. The third stage of filter called fine filters, these extended surface rigid cell filters provide high efficiency removal of multiple contaminants for a variety of application. The filters use Carbon Web filters media containing 60% activity granular activated carbon to remove odors and gaseous including dangerous pollution like dioxin and furan other pollution, activated Alumina impregnated with 5% potassium permanganate (KMnO4) to remove odors and light gases. By doing this smoke will be completely observed by filter with addition small fan pulls out the smoke where no smoke is visible and eliminate the reformation of Dioxin and Furan occurs and the clean gas is dispersing into atmosphere. The non-combustible waste and ash is collected separately and stored in well-defined area for the disposal into secured landfill. The ash quantity generation should be in the ratio of about 1/300.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A furnace apparatus configured to incinerate solid waste, comprising;
    a chamber comprising an upper pyrolysis section and a lower combustion section;
    a solid waste feed inlet positioned at an upper portion of the chamber configured to feed solid waste to the lower combustion section;
    a plurality of air inlet pipes fixedly connected to a lower portion of the chamber to receive air for combustion of the solid waste within the lower combustion section; and
    a plurality of air outlet pipes fixedly connected to the lower portion of the chamber and opposingly positioned to the air inlet pipes to exhaust combusted air from the lower combustion section, wherein a plurality of magnets are operably attached on the air inlet pipes and the air outlet pipes, wherein paramagnetic oxygen present in the received air is concentrated via the magnets, and the concentrated oxygen is introduced into a plasma generated within the combustion section to accelerate the combustion process, and to oxidize toxic matter present in the solid waste.

2. The furnace apparatus of claim 1, wherein the solid waste feed inlet is defined as a feed chute of as generally cuboidal shape comprising a top covering plate configured to open the feed chute to receive the solid waste, and a toggle clamp to close and rigidly shut the top covering plate in a closed position during the combustion process inside the lower combustion section.

3. The furnace apparatus of claim 1, further comprising an upper airlock positioned below the solid waste feed inlet, wherein the upper airlock is configured to prevent the flow of exhaust air from within the lower combustion section into the solid waste feed inlet.

4. The furnace apparatus of claim 1, further comprising an ignition chamber positioned adjacent to the lower combustion section, wherein an ignition starter material is loaded into the ignition chamber, and ignited to be introduced into the lower combustion section for the combustion of the solid waste.

5. The furnace apparatus of claim 1, further comprising a drip pan chamber positioned below the lower combustion section, wherein the drip pan chamber is configured to collect the combustion waste which drips out of the lower combustion section.

6. The furnace apparatus of claim 1, further comprising a bottom stirrer positioned at a lower section of the lower combustion section, wherein the bottom stirrer is configured to stir the solid waste during the combustion process.

7. The furnace apparatus of claim 1, further comprising a bottom airlock positioned below the lower combustion section, wherein the bottom airlock is configured to prevent expulsion of combusted air through a lower section of the lower combustion section.

8. The furnace apparatus of claim 1, further comprising coil sections positioned within the upper pyrolysis section and the lower combustion section, wherein the coil sections are configured to transfer the heat via conduction to assist in the combustion of the solid waste and to prevent the overheating of the walls of the chamber.

9. The furnace apparatus of claim 1, further comprising a walk way positioned adjacent to the chamber configured to allow a user to climb above the chamber and open the top covering plate of the solid waste feed inlet to feed in the solid waste.

10. The furnace apparatus of claim 1, further comprising a combusted air exhaust assembly comprising:
    a chimney upwardly extending from the air outlet pipes and in fluid communication with the lower combustion section;
    a blower fan positioned within the chimney at a predefined position, wherein the blower fan is configured to provide an induced draft to suction and exhaust the combusted gases from the lower combustion section; and
    a scrubber positioned at a predefined distance above the blower fan, wherein the scrubber is configured to separate particulate matter from the exhausted combusted air.

* * * * *